Patented July 8, 1941

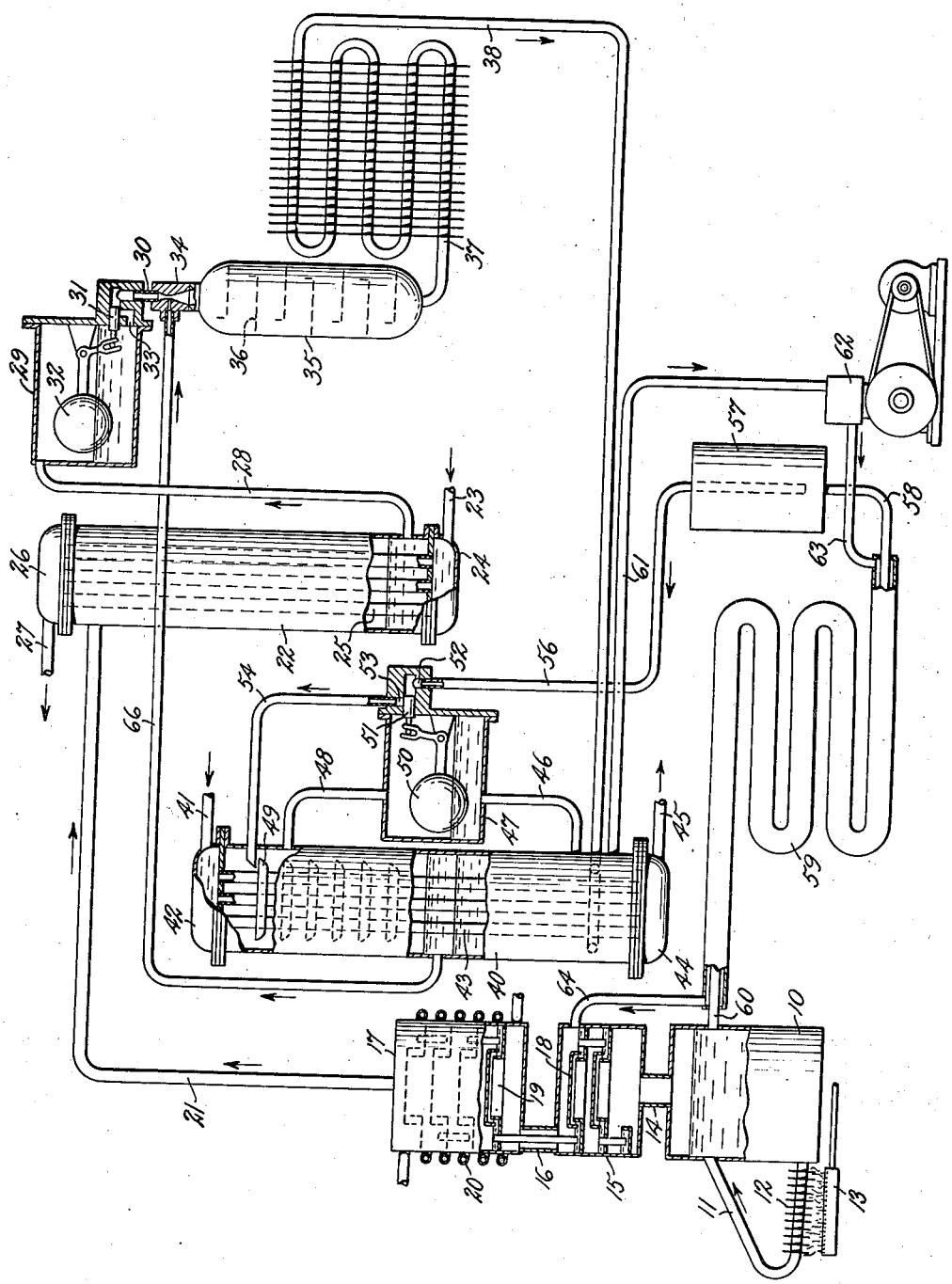

2,248,178

UNITED STATES PATENT OFFICE 2,248,178

REFRIGERATION

Walter A. Kuenzli, Evansville, Ind., assignor to Servel, Inc., New York, N. Y., a corporation of Delaware Application September 2, 1937, Serial No. 162,079

13 Claims. (Cl. 62—119.5)

My invention relates to refrigeration and more particularly to a system for producing refrigeration making use of evaporation of a plurality of refrigerants.

It is an object of the invention to provide an improved method and apparatus for producing refrigeration with a plurality of refrigerant fluids having different vapor pressure characteristics resulting in increased efficiency in this type of refrigeration. Another object is to provide an improved method and apparatus for carrying out evaporation of different fluids in the presence of each other.

The invention, together with the objects and advantages thereof, is set forth with particularity in the following description and accompanying drawing forming a part of this specification and of which the single figure shows more or less diagrammatically a refrigeration system embodying the invention.

A generator 10 comprises a vessel provided with a heating loop 11. The lower end of the loop 11 is connected to the lower part of the generator vessel and the upper end of the loop 11 is connected to the upper part of the generator vessel. The lower part of the loop 11 is provided with a heat transfer surface formed by fins 12 and this part of the loop is heated by any suitable heating means such as a gas burner 13.

The upper part of the generator 10 is connected by a conduit 14 to an analyzer 15. The analyzer 15 is connected by a conduit 16 to a rectifier 17. The analyzer 15 is provided with conventional bubble trays 18. The rectifier 17 is provided with conventional bubble trays 19. The rectifier 17 may be provided with a water cooling coil 20. The rectifier 17 may be air-cooled if desired.

The rectifier 17 is connected by a conduit 21 to the upper end of a condenser 22. The condenser is provided with a water cooling circuit comprising an inlet conduit 23, a header 24, a bank of conduits 25, a header 26, and an outlet conduit 27.

The lower part of the condenser 22 is connected by a conduit 28 to a high side float chamber 29. The lower part of the float chamber 29 is provided with an outlet conduit 30. The valve 31 is operated by a float 32 and controls the flow of liquid from the lower part of the float chamber 29 through passage 33 to the outlet conduit 30.

The outlet conduit 30 is connected to an aspirator 34 which is in turn connected to the upper end of a vessel 35. The vessel 35 is provided with baffle plates 36 and may be referred to as an evaporator mixing vessel. The lower end of the mixing vessel 35 is connected to the lower end of an evaporator coil 37. The upper end of the evaporator coil 37 is connected by a conduit 38 to the lower part of an absorber 40.

The absorber 40 is provided with a water cooling circuit including an inlet conduit 41, a header 42, a bank of conduits 43, a lower header 44, and an outlet conduit 45. The lower part of the absorber 40 is connected by a conduit 46 to the lower part of a float chamber 47. The upper part of the float chamber 47 is connected by a conduit 48 to the upper part of the absorber. In the upper part of the absorber 40 are a plurality of drip trays 49 which may be secured on the pipes 43. In the float chamber 47 is a float 50 which operates a valve 51. The valve 51 controls the flow of liquid from passage 52 to passage 53 in the head on the float vessel 47. The passage 53 is connected by a conduit 54 to the upper end of the absorber 40. The upper end of conduit 54 is open above the top drip tray 49.

The passage 52 is connected by a conduit 56 to a vapor separating trap 57. The trap 57 is connected by a conduit 58, the inner passage of a liquid heat exchanger 59, and a conduit 60 to the upper part of the generator 10. The lower part of the absorber 40 is connected by a conduit 61, a pump 62, a conduit 63, the outer passage of liquid heat exchanger 59, and conduit 64 to the analyzer 15.

An intermediate part of the absorber 40 is connected by a conduit 66 to the suction inlet of the aspirator 34. Determination of the point at which conduit 66 is connected to the absorber will be taken up in connection with explanation of operation of the system set forth below.

There is placed in the system two refrigerant fluids and a liquid absorbent for one of the refrigerant fluids. For example, the refrigerant fluids may be ammonia and isobutane, and the liquid absorbent may be water. The ammonia is highly soluble in water whereas isobutane is substantially insoluble in water. Isobutane and ammonia are chemically inert with respect to each other. When the system is idle a water solution of ammonia will be contained in the lower parts of the system and the other parts of the system will be filled with ammonia vapor and isobutane vapor.

In operation of the system, heat is applied by the burner 13 to the lower part of the generator heating coil 11 and the liquid pump 62 is operated to cause flow of liquid in the direction of the arrows associated with the pipes connected thereto. Heating of liquid in the lower part of coil 11 causes expulsion of ammonia vapor from solution. The expelled vapor rises through the coil 11 into the upper part of the generator and causes flow of liquid from the lower part of the generator through the coil 11 to the upper part. The expelled ammonia vapor flows from the upper part of the generator 10 through conduit 14 into the analyzer 15 where it bubbles through liquid in the trays 18. The vapor flows from the analyzer through conduit 16 into the rectifier 17 where it bubbles through liquid in the trays 19. The vapor flows from the rectifier 17 through conduit 21 into the condenser 22. The liquid in the analyzer trays 18 is strong solution which enters the analyzer through conduit 64. Vapor from the generator bubbles through this liquid and so comes into equilibrium with the strongest solution in the system whereby there is a minimum content of water vapor in the ammonia vapor which flows through conduit 16 to the rectifier. The rectifier is cooled as by water flowing through the cooling coil 20. Liquid in the trays 19 is water deposited by condensation out of the vapor which bubbles through the liquid in these trays.

In the condenser 22, ammonia vapor condenses to liquid on the bank of cooling pipes 25 and the liquid ammonia drains into the lower part of the condenser. Liquid ammonia flows from the lower part of the condenser through conduit 28 into the float chamber 29.

Responsive to increase of liquid level in the float chamber 29, as well known in connection with operation of high side float valves, liquid is permitted to flow from the float chamber through passage 33 and valve 31 into conduit 30. From conduit 30 ammonia flows through the aspirator 34 into the evaporator mixing vessel 35.

The generator, analyzer, rectifier, condenser, and float chamber are in what may be referred to as the higher pressure side of the system, meaning that the pressure in this part of the system is somewhat higher than the pressure in the evaporator vessel 36 and coil 37 and also the absorber 40. This difference in pressure is substantially the difference in the condensing pressures of ammonia and isobutane at the condensing temperatures.

Due to the increase in kinetic energy of the ammonia in passing through the aspirator to a region of lower pressure, liquid isobutane is drawn from the absorber through conduit 66. The isobutane is drawn along with ammonia into the evaporator vessel 35 in which the ammonia and isobutane become well mixed. The ammonia and isobutane both start to evaporate in the vessel 35 so that this vessel will contain vaporous ammonia and isobutane and also well mixed liquid ammonia and isobutane. The vapors and the mixed liquids pass from the mixing vessel into the evaporator coil 37 where further evaporation of the isobutane and ammonia takes place. The mixture of isobutane and ammonia vapors flows from the evaporator coil 37 through conduit 38 into the lower part of absorber 40.

The mixture of the refrigerant fluids in the evaporator is a distinctive feature of the invention. By this expedient, small quantities of both refrigerant fluids are in the immediate presence each of the other. In the evaporator, isobutane vapor provides part of the total pressure and ammonia vapor provides the other part of the total pressure so that the vapor of each refrigerant fluid is in effect an inert gas with respect to the other fluid. The close inter-mixture results in a small mean diffusion distance, that is, a steepening of the diffusion gradient of ammonia into isobutane vapor and isobutane into ammonia vapor. This also results in a large liquid surface of each refrigerant fluid being exposed for evaporation and diffusion into vapors in the evaporator. The more intimate the mixture, the greater the evaporation surfaces and the smaller the mean diffusion distances and the better the results.

Weakened absorption liquid flows from the generator 10 through conduit 60, the liquid heat exchanger 59, conduit 58, vessel 57, conduit 56, passage 52, valve 51, passage 53, and conduit 54 into the upper end of the absorber 40. Weak absorption liquid issuing from the upper end of conduit 54 descends upon the topmost of the shallow trays 49 and drips downward over these trays and thence into the lower part of the absorber. The absorber is cooled as, for instance, by cooling water flowing through the bank of pipes 43. The mixture of ammonia and isobutane vapors which enters the lower part of the absorber through conduit 38 bubbles upward through the liquid in the lower part of the absorber and then comes into contact with the liquid dripping downward over the trays 49.

Ammonia vapor is absorbed into the absorption liquid as the vapors bubble up through the liquid in the lower part of the absorber and also as the vapors pass in contact with liquid dripping downward in the upper part of the absorber. The partial pressures of the isobutane and ammonia vapors as they enter the absorber from conduit 38 together make up the total pressure in the lower pressure part of the system which includes the evaporator and absorber. As ammonia vapor is absorbed in solution in the absorber, the partial pressure of the isobutane vapor increases until in the upper part of the absorber its partial pressure substantially reaches the total pressure in the lower pressure part of the system. Upon this increase in pressure, the isobutane vapor condenses in the upper part of the absorber to liquid and the liquid flows downward together with the absorption liquid into the lower part of the absorber. However, liquid isobutane is substantially immiscible with the ammonia solution. The specific density of the liquid isobutane is also less than that of the water solution of ammonia so that the liquid isobutane stratifies and floats on the surface of the ammonia solution in the lower part of the absorber.

The float chamber 47 being connected by conduit 46 to the lower part of the absorber 40, liquid in the float chamber is ammonia solution. The float chamber 47 is not cooled so that propane will not condense therein and if any liquid propane gets into this chamber it will vaporize and vent through conduit 48 into the upper part of the absorber. The level of liquid in the float chamber 47 will be lower than the level of liquid in the absorber 40 because the column of liquid extending upward into the float chamber is ammonia solution whereas part of the liquid column in the absorber consists of the lighter liquid isobutane. The level of liquid in the float vessel 47 will not be very much higher than the surface level of ammonia solution in the absorber below the stratified liquid isobutane. The float 50 operates responsive to the level of liquid in the float chamber 47 to control flow of weakened absorption liquid into the upper part of the absorber. The valve 51 operated by the float 50 maintains substantially a constant level of liquid in the float chamber and, therefore, a substantially constant level of liquid in the absorber 40. Conduit 66 is connected to the absorber 40 at a point which is above the surface level of ammonia solution but below the surface level of the stratified liquid isobutane so that liquid which enters conduit 66 will be liquid isobutane. The liquid isobutane is drawn through conduit 66, as previously described, into the evaporator mixing vessel 35 by the flow of ammonia through the aspirator or Venturi nozzle 34.

Enriched ammonia solution is drawn from the lower part of the absorber through conduit 61 and caused to flow by the pump 62 through conduit 63, the liquid heat exchanger 59, and conduit 64 into the upper part of the analyzer 15. Weakened absorption liquid flows from the generator 10 to the absorber 40 in the previously described path under the control of the float valve 51 due to the difference of pressures in the generator and the absorber.

What is claimed is:

1. A method of refrigeration which includes flowing a plurality of refrigerant fluids to a common place of evaporation, and utilizing flow of one of said fluids to cause flow of another of said fluids in liquid phase.

2. A refrigeration system including a place of evaporation, a place of gas and liquid contact, a generator, a condenser, said system having a high pressure portion including said generator and condenser, and a low pressure portion including said places of evaporation and gas and liquid contact, means for circulating an absorption liquid through and between said generator and said place of gas and liquid contact, said system containing a plurality of refrigerant fluids one of which is soluble in the absorption liquid, means for conducting vapor of said soluble refrigerant from said generator to said condenser, and means for conducting liquefied refrigerant from said condenser to said place of evaporation, means for conducting vapor from said place of evaporation to said place of gas and liquid contact, means to cool said place of gas and liquid contact to cause absorption of said first refrigerant and condensation of another of said refrigerants, and means to conduct said second refrigerant in liquid phase from said place of gas and liquid contact to said place of evaporation.

3. A refrigeration system as set forth in claim 2 which also includes means for causing intimate mixture of said liquid refrigerants in said place of evaporation.

4. A refrigeration system as set forth in claim 2 which also includes means utilizing flow of one of said liquid refrigerants to the place of evaporation to cause flow of the other of said liquid refrigerants to the place of evaporation.

5. A refrigeration system as set forth in claim 2 which also includes an aspirator utilizing flow of said first liquid refrigerant from the higher pressure condenser to the lower pressure place of evaporation to cause flow of said second liquid refrigerant from said place of gas and liquid contact to said place of evaporation.

6. An absorption refrigeration system including a generator and a condenser in a higher pressure portion of the system and an absorber and an evaporator in a lower pressure portion of the system, said system containing an absorption liquid and a plurality of refrigerant fluids of which one is soluble and the other is substantially insoluble in the absorbent, means for cooling said absorber to cause absorption of one of said refrigerants and liquefaction by condensation of the other, said second liquid refrigerant being of less specific gravity than absorption solution so that the liquid refrigerant and solution separate by stratification in the absorber, and means to control circulation of absorption liquid between said generator and absorber so that the surface level of the absorption solution strata does not rise above a certain level in the absorber, and means for conducting liquid refrigerant from a point above said certain level from said absorber to said evaporator.

7. An absorption refrigeration system as set forth in claim 6 in which said soluble refrigerant is expelled from solution in the generator and condensed to liquid in said condenser, and means is provided which utilizes flow of said first liquid refrigerant from the higher pressure condenser to the lower pressure evaporator to cause flow of said second liquid refrigerant from the absorber to the evaporator.

8. In an absorption refrigeration system utilizing a plurality of refrigerants, an absorber, conduits for conducting absorption liquid to and from said absorber, a conduit for conducting liquefied refrigerant from said absorber at a certain level to an evaporator, the liquefied refrigerant being lighter than the absorption solution whereby the liquid and solution separate by stratification, and means for controlling flow of absorption liquid to said absorber so that the surface level of the absorption solution strata does not rise to said certain point at which liquid refrigerant is withdrawn.

9. In an absorption refrigeration system utilizing a plurality of refrigerant fluids, an evaporator, means for separately liquefying said refrigerants, and means utilizing flow of one of said liquid refrigerants to said evaporator to cause flow of another of said liquid refrigerants to said evaporator.

10. A refrigeration system as set forth in claim 9 in which said means is an aspirator and also causes intimate mixture of said liquid refrigerants.

11. In an absorption refrigeration system utilizing a plurality of refrigerant fluids, an evaporator, means for separately liquefying the refrigerant fluids, and an aspirator utilizing flow of one of said liquid refrigerants to said evaporator to cause flow of another of said liquid refrigerants to said evaporator.

12. A method of refrigeration which includes flowing a plurality of refrigerant fluids to a common place of evaporation, and utilizing flow of one of said fluids to cause flow against gravity of another of said fluids in liquid phase.

13. In an absorption refrigeration system utilizing a plurality of refrigerant fluids, an evaporator, means for separately liquefying said refrigerants, and means utilizing flow of one of said liquid refrigerants to said evaporator to cause flow against gravity of another of said liquid refrigerants to said evaporator.

WALTER A. KUENZLI.